United States Patent [19]
Tsujimoto et al.

[11] Patent Number: 5,555,045
[45] Date of Patent: Sep. 10, 1996

[54] HEAD MOVEMENT FEATURE IN A CAMERA USING A FILM WITH A MAGNETIC MEMORY PORTION

[75] Inventors: Shinichi Tsujimoto, Machida; Masaaki Ishihara, Yokohama; both of Japan

[73] Assignee: Canon Kabushiki Kaisha, Tokyo, Japan

[21] Appl. No.: 474,183

[22] Filed: Jun. 7, 1995

Related U.S. Application Data

[63] Continuation of Ser. No. 191,156, Feb. 3, 1994, abandoned, which is a continuation of Ser. No. 871,545, Apr. 21, 1992, abandoned.

[30] Foreign Application Priority Data

Apr. 26, 1991  [JP]  Japan ...................................... 3-122995

[51] Int. Cl.[6] ............................ G03B 17/24; G03B 17/00; G11B 5/54
[52] U.S. Cl. ............................ 354/106; 354/76; 354/203; 360/105
[58] Field of Search ...................................... 354/105, 106, 354/76, 203, 206; 360/105

[56] References Cited

U.S. PATENT DOCUMENTS

| | | | |
|---|---|---|---|
| 4,270,854 | 6/1981 | Stemme et al. ............................ | 354/76 |
| 4,642,717 | 2/1987 | Matsuda et al. ........................ | 360/105 |
| 4,841,319 | 6/1989 | Hansen .................................... | 354/275 |
| 4,864,445 | 9/1989 | Tezuka .................................... | 360/105 |
| 4,878,075 | 10/1989 | Cannon .................................. | 354/173.1 |
| 5,003,329 | 3/1991 | Itakashi .................................. | 354/106 |
| 5,016,030 | 5/1991 | Dwyer et al. ........................ | 354/106 X |
| 5,136,318 | 8/1992 | Aoshima .............................. | 354/203 X |

*Primary Examiner*—Michael L. Gellner
*Assistant Examiner*—Eddie C. Lee
*Attorney, Agent, or Firm*—Fitzpatrick, Cella, Harper & Scinto

[57] ABSTRACT

A camera uses a film with a magnetic memory portion and includes a magnetic head for writing or reading information to or from the magnetic memory portion of the film, a moving-away device for moving the magnetic head away from a position where the magnetic head acts, and a driving source for driving the moving-away device. The magnetic head and the moving-away device are arranged on the side of a back lid of the camera, with respect to a film transporting path, and the driving source is arranged on the side of a photographic lens, with respect to the film transporting path. Alternatively, the camera includes a magnetic head for writing or reading information to or from the magnetic memory portion of the film, a following device for making the magnetic head follow a wave-like motion of the film while the film is being transported, and a moving-away device for moving the magnetic head as a unit with the following device away from a position where the magnetic head acts.

34 Claims, 5 Drawing Sheets

HEAD MOVEMENT FEATURE IN A CAMERA USING A FILM WITH A MAGNETIC MEMORY PORTION

This application is a continuation of prior application Ser. No. 08/191,156 filed on Feb. 3, 1994, which is a continuation of application Ser. No. 07/871,545 filed on Apr. 21, 1992, both now abandoned.

BACKGROUND OF THE INVENTION

1. Field of the Invention

The present invention relates to an improvement in a camera using a film with a magnetic memory portion, in which information is written to or read from the magnetic memory portion of the film. More specifically, the present invention pertains to a head movement feature for such a camera.

2. Description of the Related Art

A camera using a film with a magnetic memory portion has been disclosed in U.S. Pat. No. 4,878,075. This camera is arranged to be able to write information pertaining to a shutter time, an aperture value, a date of year, month and day, etc., to the magnetic memory portion, to read out either the same written information, or information previously written, pertaining to the ISO, the specified number of film frames, etc., by means of a magnetic head in contact with the magnetic memory portion of the film during a transporting operation of the film.

However, the magnetic head, which is merely in the reading or writing position, or in actual contact with the magnetic memory portion of the film, causes the following problems.

(1) In a film cartridge completely containing the whole roll of film therein, including the leader part of the film, when the film is thrust out of the cartridge by driving its shaft with a fork after the film cartridge is inserted into a cartridge chamber, as disclosed in U.S. Pat. No. 4,841,319, the leader part of the film runs into the magnetic head while the film is thrust out from the cartridge, and an automatic film loading operation becomes impossible;

(2) If the magnetic head is in pressure contact with the film for a long time, the film will become deformed; and (3) If the magnetic head is in pressure contact with the film during an exposure operation, the film surface becomes uneven with the result that the image quality of a photograph made from the film deteriorates.

In order to solve these problems, the applicant has proposed in U.S. patent application Ser. No. 633,997 a camera wherein either the magnetic head or a pad holding the film between the magnetic head and the pad is moved away from the film excluding the interval when the information is written to or read from the magnetic memory portion of the film.

However, the aforementioned camera has the following problems.

(1) The camera is arranged to position the magnetic head on the side of the back lid of the camera and to position the pad on the side of the photographic lens of the camera across the film because the magnetic memory portion of the film is provided on the side of the base side of the film.

Additionally, the magnetic memory portion is provided at a location corresponding to a photographic frame of the film.

For these reasons, in a type of conventional camera having a focal-plane shutter, such as a single-lens reflex camera, the mechanism moving the pad away from the film interferes with the focal-plane shutter. Consequently, such a camera cannot function properly.

(2) Regarding the mechanism for moving the magnetic head away from the film, a motor used as a driving source for moving the magnetic head away from the film is arranged on the side of the magnetic head, i.e., on the side of the back lid of the camera. This makes the size of the camera on the side of the back lid very large. That is, the camera becomes bulky in this area.

Further, the camera disclosed in the aforementioned U.S. patent application Ser. No. 633,997 has the following problems for the reason that the film moves up and down in a wave-like motion while being transported.

(1) The up and down wave-like motion causes a positional deviation perpendicular to the film supply direction between the magnetic head and the magnetic memory portion of the film. Therefore, the photographic information cannot be accurately written to and read from the magnetic memory portion of the film.

(2) The magnetic gap of the magnetic head must make contact with the magnetic memory portion of the film as perpendicularly as possible to a film transporting direction. However, the above-stated motion of the film lowers the degree of perpendicularity of the magnetic gap of the magnetic head relative to the film transporting direction.

In order to solve these problems, the applicant has proposed in U.S. patent application Ser. No. 634,102 a camera having a following mechanism for causing the magnetic head follow the up and down wave-like motion of the film.

However, when the following mechanism is combined in a non-interfering fashion with the magnetic head moving-away mechanism disclosed in the aforementioned U.S. patent application Ser. No. 633,977, the camera becomes large and complicated.

SUMMARY OF THE INVENTION

One aspect of the present invention is to provide a camera using a film with a magnetic memory portion and comprising a magnetic head for writing or reading information to or from the magnetic memory portion of the film, moving-away means for moving the magnetic head away from a position where the magnetic head acts, and a driving source for driving the moving-away means, wherein the magnetic head and the moving-away means are arranged on the side of a back lid of the camera, with respect to the film transporting path, and wherein the driving source is arranged on the side of a photographic lens, with respect to the film transporting path.

Another aspect of the present invention is to provide a camera using a film with a magnetic memory portion and comprising a magnetic head for writing or reading information to or from the magnetic memory portion of the film, following means for making the magnetic head follow a wave-like motion of the film at the time the film is transported, and moving-away means for moving the magnetic head away from a position where the magnetic head acts.

According to these aspects, the camera using the film with the magnetic memory portion is prevented from becoming large and complicated.

Other aspects of the present invention will become apparent from the following description of the preferred embodiments of the present invention.

DETAILED DESCRIPTION OF THE PREFERRED EMBODIMENTS

Figure 1:
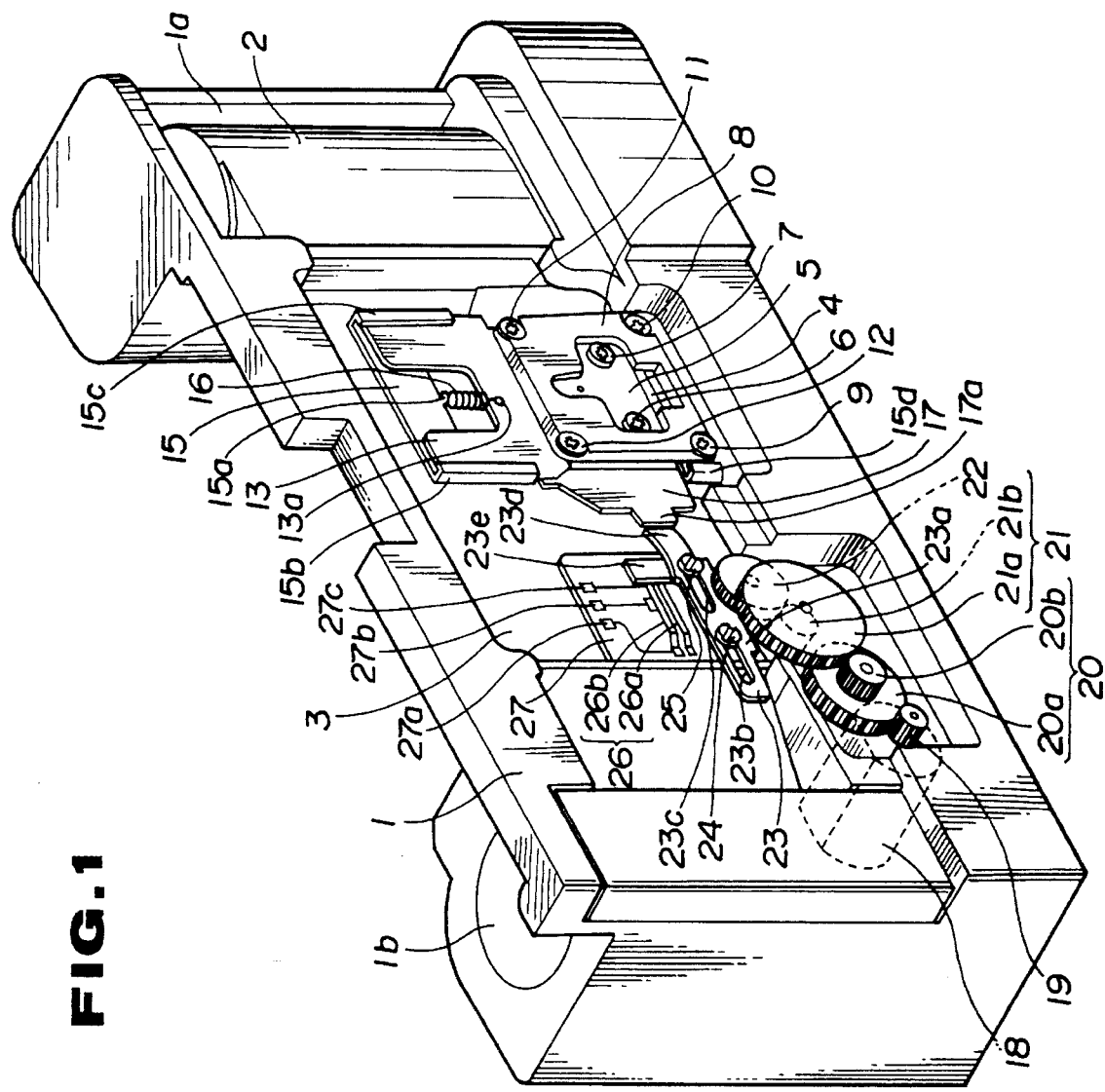
FIG. 1 is a perspective view of a construction of a essential part of a camera in accordance with one preferred embodiment of the present invention.

Preferred embodiments of the present invention now will be described with reference to the accompanying drawings.

Referring to FIG. 1 through FIG. 4, constitutes one embodiment of the present invention wherein reference numeral 1 denotes a camera body; 1a, a cartridge chamber provided for the camera body 1; 1b, a spool chamber; 2, a film cartridge; and 3, a film pressure plate which is provided for the camera body 1 in such a manner that the film pressure plate 3 abuts on two outer rails 1c (In FIG. 2, only one of two outer rails 1c is shown.) provided for the camera body 1, and forms a space, i.e., a tunnel, for causing a film F to pass therethrough, together with two inner rails 1d. (In FIG. 2, only one of two inner rails 1d is shown).

Reference numeral 4 denotes a magnetic head having three magnetic tracks 4a, 4b, and 4c; 5, an installing board fixed to the magnetic head 4 by means of spot welding, for example.

Reference numeral 8 denotes a support fixed to the installing board 5 by means of screws 6 and 7. The support 8 has a film receiving portion 8a (see FIG. 2 and FIG. 3) in such a manner that the dimensional accuracy of distances L1, L2 and L3 between an upper portion of the film receiving portion 8a and the magnetic tracks 4a, 4b, and 4c is maintained. The support 8 is installed in a sliding board 13 by means of screws 9 to 12. This sliding board 13 is fitted into the bent portions 15b to 15d of a guide board 15 to be slidable up and down regarding FIG. 2. (A fourth bent portion in which the board 13 is fitted is not shown.)

Figure 2:
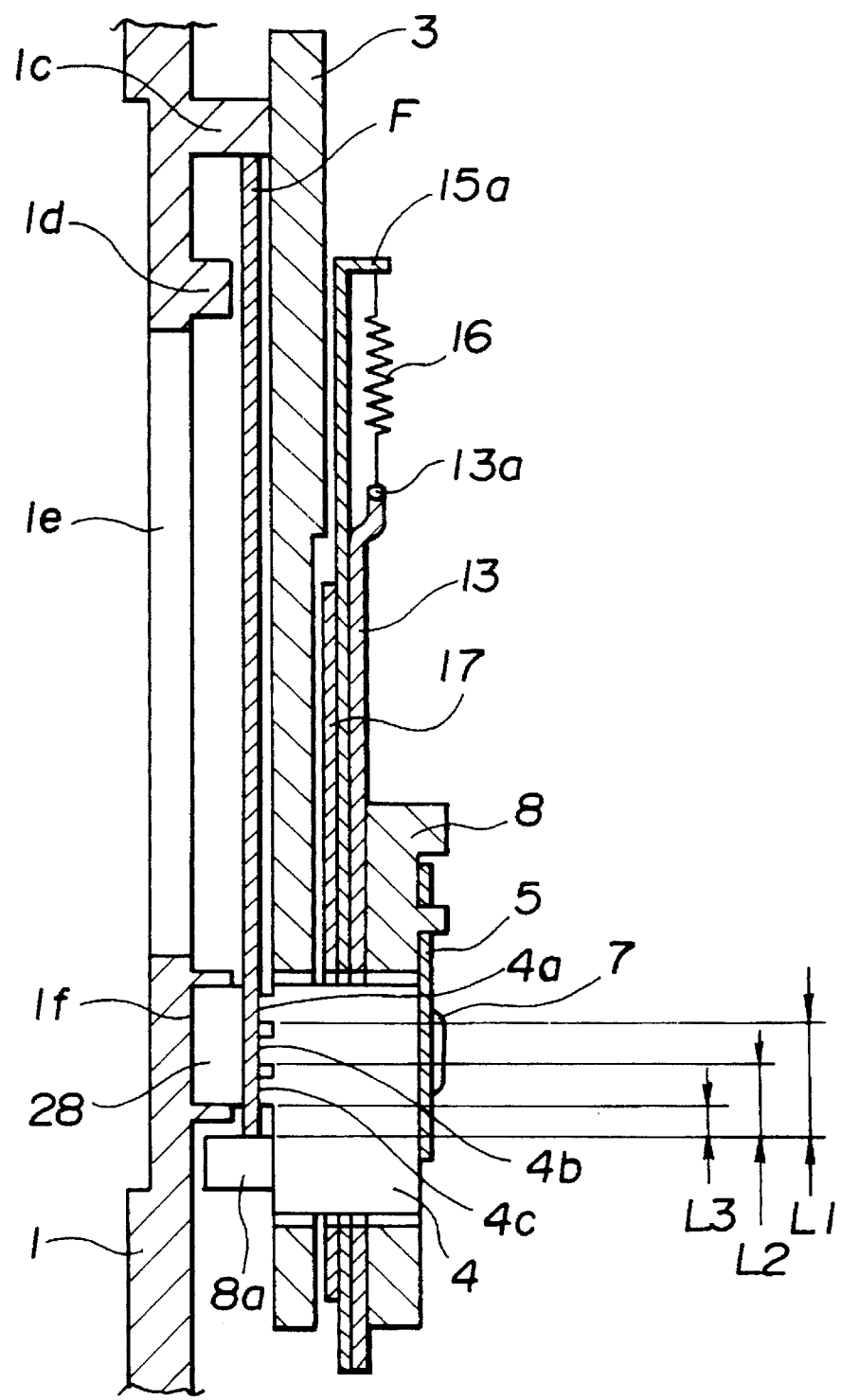
FIG. 2 is a vertical cross-sectional view of the part of the camera shown in FIG. 1.
Figure 3:
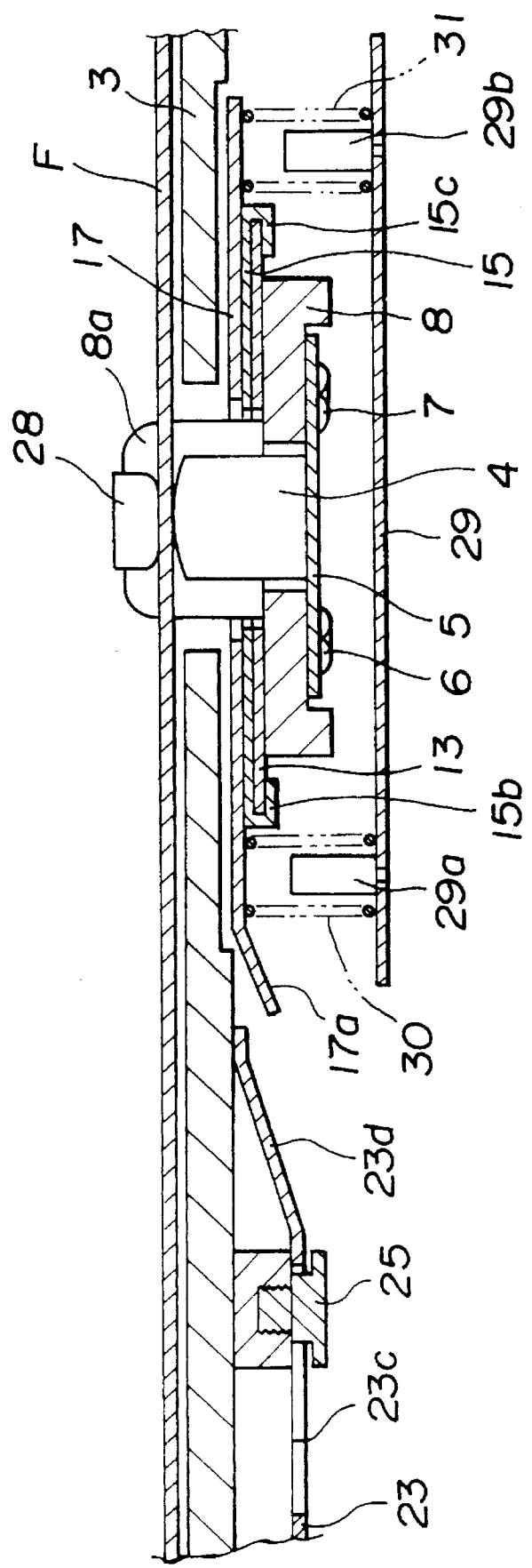
FIG. 3 is a horizontal, cross-sectional view of the part of the camera shown in FIG. 1.

Reference numeral 16 denotes an extension spring attached between a hole 13a provided for the sliding board 13 and an upright portion 15a of the guide board 15, whereby the extension spring 16 constantly urges the sliding board 13 upward regarding FIGS. 1 and 2. Reference numeral 17 denotes a base board that is fixed to the guide board 15 in an unillustrated way and that is pressed toward the film pressure plate 3 by means of compression springs 30 and 31 and a fixed board 29 fixed to the camera body 1 or the film pressure plate 3 as shown in FIG. 3. Reference numeral 17a denotes an upright portion of the base board 17; 29a and 29b, axes fixed to the fixed board 29, for guiding the springs 30 and 31.

Reference numeral 18 denotes a motor installed in the camera body 1; 19, a pinion fixed on a shaft of the motor 18; and 20 to 22, a gear train.

Reference numeral 23 denotes a moving-away lever which has elongated holes 23b and 23c and is movable in right and left directions regarding FIG. 1 by means of pins 24 and 25 fitting on the elongated holes 23b and 23c. The moving-away lever 23 has a rack portion 23a meshing with the last gear 22 of the gear train 20 to 22. The moving-away lever 23 has an arm portion 23e to which short-circuit armatures 26a and 26b are fixed. The armatures 26a and 26b are arranged to be in contact with a printed circuit board 27, wherein a position of the moving-away lever 23 can be detected on the basis of a electric condition of draw-out patterns 27a to 27c. The moving-away lever 23 also has a bent portion 23d at the position corresponding to the aforementioned upright portion 17a of the base board 17.

Reference numeral 28 denotes a pad fixed to a recess 1f of the camera body 1, which is provided between the outer rail 1c and the inner rail 1d shown in FIG. 2, by means of an adhesive, for example. The film F is pressed against the pad 28 by means of the magnetic head 4 urged by the aforementioned springs 30 and 31.

An operation of the aforementioned construction will be described below.

A lower edge portion of the film F abuts the film receiving portion 8a of support 8 as shown in FIGS. 2 and 3. Though the film F moves with a waving, or shaking, motion up and down in the tunnel as described hereinabove, the lower edge portion of the film F constantly abuts on the film receiving portion 8a by the urging force of the spring 16. Therefore, the accuracy of the track positional dimensions L1, L2, and L3 shown in FIG. 2 is maintained.

In addition, the contacts between the three magnetic tracks of the film F and the magnetic gaps 4a to 4c of the magnetic head 4 are maintained by the urging forces of the springs 30 and 31.

Thus, reading information during pre-winding of the film F or writing information during winding one frame of the film F to or from the magnetic memory portion of the film F can be effectively accomplished.

Furthermore, the urging force of the spring 16 can be weak because the film receiving portion 8a only has to follow the up and down wave-like motion of the film F by means of the urging force of the spring 16. Therefore, the spring 16 does not cause the film F to bend or to damage a flatness of the film at the time of an exposure operation.

Next, an operation of moving the magnetic head 4 away from the film F: during (i) the initial stage of a film auto-loading operation; (ii) the exposure operation; (iii) or in the event that a camera having been loaded with a film F has not been used for a long time will be described below.

Figure 4:
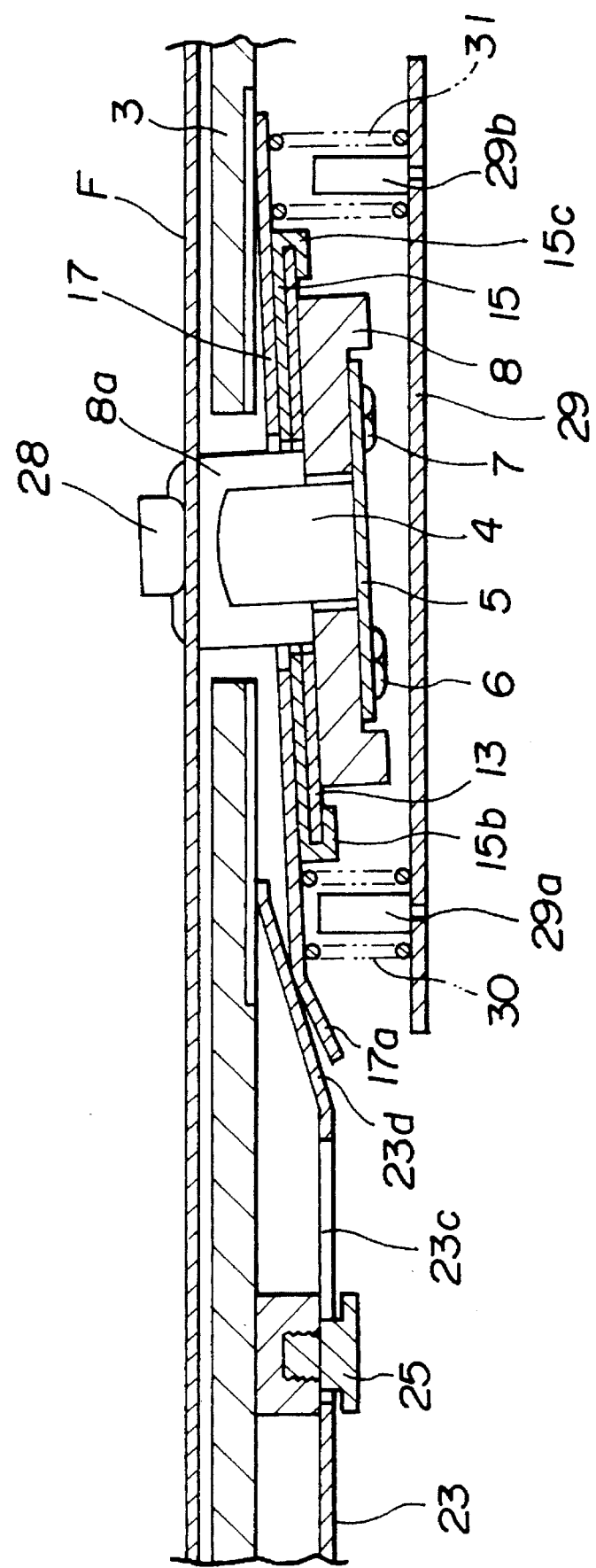
FIG. 4 is a horizontal, cross-sectional view of the part of the camera shown in FIG. 1 in a state where a magnetic head is moved away from a film, relative to its position shown in FIG. 3.

When the motor 18 rotates counterclockwise, the gear 22 rotates clockwise through the gears 19 to 21, and the moving-away lever 23 moves to the right as viewed in FIG. 1 (in the direction as viewed in FIG. 3). At this time, as shown in FIG. 4, the bent portion 23d of the moving-away lever 23 goes under the upright portion 17a of the base board 17 to act in such a manner as to lift the base board 17 against the urging force of the springs 30 and 31, which is in the state of FIG. 4. Thus, the magnetic head 4 is moved away from where the magnetic head 4 is in contact with the film F because the base board 17, the guide board 15, the slide board 13, the support 8, the installing board 5 and the magnetic head 4 move as a unit. At this time, the moving-away lever 23 moving in the right is caused to stop at the predetermined position by the detection device comprising the printed circuit board 27 and the short-circuit armatures 26a and 26b installed on the arm portion 23e of the moving-away lever 23.

Next, when the operation to write or read information to or from the magnetic memory portion of the film F is completed, the motor is rotated clockwise to return the aforementioned construction to the initial state, i.e., the state of FIG. 3.

Figure 5:
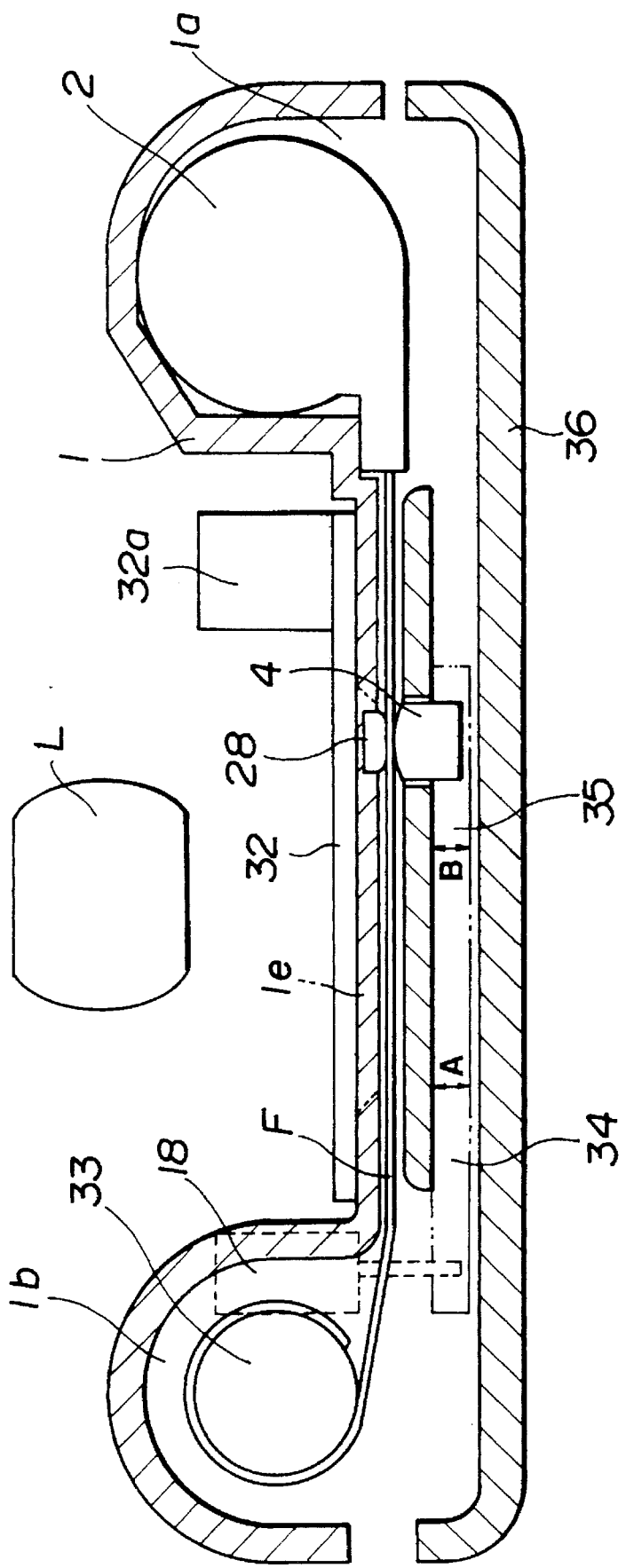
FIG. 5 is a horizontal, cross-sectional view in a case where the embodiment of FIG. 1 is applied to a camera having a focal-plane shutter.

FIG. 5 is a typical diagram showing an arrangement of the construction of FIGS. 1 to 4.

Referring to FIG. 5, reference numeral 32 denotes a focal-plane shutter installed in front of the aperture 1e of the camera body 1; 32a, a driving portion of the focal-plane shutter 32; 33, a film take-up spool; 34, a driving force transmitting mechanism, which comprises the gear train 19 to 22, shown in FIG. 1 and the moving-away lever 23 shown in FIG. 1; 35, a following mechanism 35 which comprises the following elements shown in FIG. 1: the magnetic head 4, the installing board 5, the support 8, the slide board 13, the guide board 15, the spring 16, and the base board 17; L, a photographic lens; and, 36 a back lid of the camera.

According to the present embodiment, the motor 18 used as a driving source for moving the magnetic head 4 away from the film F is arranged on the side of the photographic lens L of the camera, with respect to the film F and also at a position not interfering with the focal-plane shutter 32. The driving force transmitting mechanism 34 and the following mechanism 35 are arranged on the side of the back lid 36 of the camera, with respect to the film F. The driving force transmitting mechanism 34 is constructed by the gear train 19 to 22 (shown in FIG. 1) arranged in a plane parallel with a plane of a portion of the film F along a film transportation path and also by the moving-away lever 23 (shown in FIG. 1) moving in a plane parallel with the plane of the portion of the film F along the film transportation path. Therefore, the dimension A shown in the FIG. 5 can be made very small.

In addition, the dimension B which is the thickness of the following mechanism 35 also can be made small because the mechanism following the up and down wave-like motion of the film at the time of the film transporting operation is constructed using thin boards, i.e., the slide board 13 and the guide board 15 (see FIG. 1), and also the moving-away lever 23 (see FIG. 1) is arranged to move the magnetic head 4 away from the film F in such a manner that the moving-away lever 23 (see FIG. 1) goes under the following mechanism 35 to lift the following mechanism 35.

According to the present embodiments, as above-described, the motor 18 as a driving source for moving the magnetic head 4 away from the film F is arranged on the side of the photographic lens L of the camera, with respect to the film F, and the driving force transmitting mechanism 34 and the following mechanism 35 are arranged on the side of the back lid 36 of the camera, with respect to the film F. Therefore, in a type of camera having a focal-plane shutter 32, such as that shown in FIG. 5, it can be accomplished to prevent the dimension of the camera behind the film F from becoming large, i.e., causing the camera from becoming bulky.

In addition, according to the present embodiments, when the magnetic head 4 is moved away from the film F, i.e., the film transporting path, the magnetic head 4 is moved away as a unit with the following mechanism 35. Therefore, compared with the situation where the magnetic head 4 is arranged so as not to interfere with the following mechanism 35, it is possible to miniaturize and to simplify the construction of the camera. Moreover, the positional accuracy between the magnetic head 4 and the following mechanism 35 can be maintained and the operation to write or read information to or from the magnetic memory portion of the film performs well.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera adapted to use a film with a magnetic memory portion, comprising:

a magnetic head for performing at least one of writing information to and reading information from the magnetic memory portion of the film;

moving-away means for moving said magnetic head away from a position where said magnetic head performs at least one of the writing and reading operations; and a driving source for outputting driving power for driving said moving-away means, wherein said magnetic head and said moving-away means are arranged on a back side of a film transporting path, and wherein said driving source is arranged on a front side of the film transporting path.

2. A camera according to claim 1, wherein said moving-away means comprises means for moving said magnetic head away from the film.

3. A camera according to claim 1, wherein said moving-away means comprises movement means for moving said magnetic head, said movement means moving along a plane substantially parallel to a plane of the film transporting path, whereby said magnetic head moves away from a position where said magnetic head performs at least one of the writing and reading operations.

4. A camera according to claim 3, wherein said movement means comprises lifting means for lifting said magnetic head as a result of a moving operation of said movement means.

5. A camera according to claim 1, further comprising:

transmitting means for transmitting the driving power of said driving source to said moving-away means, said transmitting means being arranged on the back side of the film transporting path.

6. A camera according to claim 5, wherein said transmitting means comprises a gear train.

7. A camera according to claim 5, wherein said transmitting means is arranged to be substantially parallel to a plane of the film transporting path.

8. A camera according to claim 1, wherein said driving source comprises a motor.

9. A camera according to claim 1, wherein said camera further comprises a focal-plane shutter.

10. A camera according to claim 1, wherein said moving-away means comprises lifting means for lifting said magnetic head.

11. A camera adapted to use a film with a magnetic memory portion, comprising:

a magnetic head for performing at least one of writing information to and reading information from the magnetic memory portion of the film;

following means for causing said magnetic head to follow a wave-like deviation of the film; and moving-away means for moving said magnetic head, in unison with said following means, away from a position where said magnetic head performs at least one of the writing and reading operations.

12. A camera according to claim 11, wherein said following means comprises means for causing said magnetic head to follow the wave-like deviation in the film in a path substantially parallel to a plane of a transporting film portion along a film transporting path.

13. A camera according to claim 12, wherein said following means moves substantially perpendicularly to the plane of the transporting film portion along the film transporting path.

14. A camera according to claim 11, wherein said following means comprises a thin board.

15. A camera according to claim 11, further comprising:

a driving source for outputting driving power for driving said moving-away means, wherein said magnetic head, said following means and said moving-away means are arranged on a back side of a film transporting path, and wherein said driving source is arranged on a front side of the film transporting path.

16. A camera according to claim 15, further comprising transmitting means for transmitting the driving power of said driving source to said moving-away means, said transmitting means being arranged on the back side of the film transporting path.

17. A camera according to claim 16, wherein said transmitting means comprises a gear train.

18. A camera according to claim 16, wherein said transmitting means is arranged to be substantially parallel to a plane of a loaded film transporting path.

19. A camera according to claim 15, wherein said driving source comprises a motor.

20. A camera according to claim 15, wherein said camera further comprises a focal-plane shutter.

21. A camera according to claim 11, wherein said moving-away means comprises means for moving said magnetic head away from the film.

22. A camera according to claim 11, wherein said moving-away means comprises movement means for moving said magnetic head, said movement means moving along a plane substantially parallel to a plane of a film transporting path, whereby said magnetic head moves away from a position where said magnetic head performs at least one of the writing and reading operations.

23. A camera according to claim 22, wherein said movement means comprises lifting means for lifting said magnetic head as a result of a moving operation of said movement means.

24. A camera according to claim 11, wherein said moving-away means comprises lifting means for lifting said magnetic head.

25. A camera adapted to use an image recording medium with a memory portion, comprising:

information transmitting means for performing at least one of writing information to and reading information from the memory portion of the image recording medium;

moving-away means for moving said information transmitting means away from a position where said information transmitting means performs at least one of the writing and reading operations; and driving means for outputting driving power for driving said moving-away means, wherein said information transmitting means and said moving-away means are arranged on a side of an image-recording-medium transporting path that is opposite a side on which said driving means is arranged.

26. A camera adapted to use an image recording medium with a memory portion, comprising:

information transmitting means for performing at least one of writing information to and reading information from the memory portion of the image recording medium;

following means for causing said information transmitting means to follow deviations of an image recording-medium transporting path; and moving-away means for moving said information transmitting means, together with said following means, away from a position where said information transmitting means performs at least one of the writing and reading operations.

27. A camera adapted to use a film with a magnetic memory portion, comprising:

a magnetic head for performing at least one of writing information to and reading information from the magnetic memory portion of the film;

moving-away means for moving said magnetic head away from a position where said magnetic head performs at least one of the writing and reading operations; and a driving source for outputting driving power for driving said moving-away means, wherein said magnetic head and said moving-away means are arranged on a side of a film transporting path that is opposite a side on which said driving source is arranged.

28. A camera adapted to use a film with a magnetic memory portion, comprising:

a magnetic head for performing at least one of writing information to and reading information from the magnetic memory portion of the film;

following means for causing said magnetic head to follow a wave-like deviation of a film; and moving-away means for moving said magnetic head, together with said following means, away from a position where said magnetic head performs at least one of the writing and reading operations.

29. A camera adapted to use a film with a magnetic memory portion, comprising:

a magnetic head for performing at least one of writing information to and reading information from the magnetic memory portion of the film;

moving means for moving said magnetic head; and a driving source for outputting driving power for driving said moving means, wherein said magnetic head is arranged on a back side of a film transporting path, and wherein said driving source is arranged on a front side of the film transporting path.

30. A camera adapted to use a film with a magnetic memory portion, comprising:

a magnetic head for performing at least one of writing information to and reading information from the magnetic memory portion of the film;

following means for causing said magnetic head to follow movement of the film; and moving means for moving said following means and said magnetic head in unison in a direction different from a direction in which said following means follows the movement of the film.

31. A camera adapted to use an image recording medium with a memory portion, comprising:

information transmitting means for performing at least one of writing information to and reading information from the memory portion of the image recording medium;

moving means for moving said information transmitting means;

driving means for outputting driving power for driving said moving means, wherein said information transmitting means is arranged on a side of an image-recording-medium transporting path that is opposite a side on which said driving means is arranged.

32. A camera adapted to use an image recording medium with a memory portion, comprising:

information transmitting means for performing at least one of writing information to and reading information from the memory portion of the image recording medium;

following means for causing said information transmitting means to follow movement of the image recording medium; and moving means for moving said following means and said information transmitting means together in a direction different from a direction in which said following means follows the movement of the image recording medium.

33. A camera adapted to use a film with a magnetic memory portion, comprising:

a magnetic head for performing at least one of writing information to and reading information from the magnetic memory portion of the film;

moving means for moving said magnetic head away from a position where said magnetic head performs at least one of the writing and reading operations; and a driving source for outputting a driving power for driving said moving means, wherein said magnetic head is arranged on a side of a film transporting path that is opposite a side on which said driving source is arranged.

34. A camera adapted to use a film with a magnetic memory portion, comprising:

a magnetic head for performing at least one of writing information to and reading information from the magnetic memory portion of the film;

following means for causing said magnetic head to follow movement of the film; and moving means for moving said following means and said magnetic head together in a direction different from a direction in which said following means follows movement of the film.

* * * * *

UNITED STATES PATENT AND TRADEMARK OFFICE
CERTIFICATE OF CORRECTION

PATENT NO. : 5,555,045

DATED : September 10, 1996

INVENTOR(S) : SHINICHI TSUJIMOTO, ET AL.

It is certified that error appears in the above-indentified patent and that said Letters Patent is hereby corrected as shown below:

On the title page, item:

[56] References Cited

"Itakashi" should read --Itabashi--.

Column 2

Line 23, "problems,the" should read --problems, the--.
    Line 65, "a" (third occurrence) should read --an--.

Column 3

Line 19, delete "Referring to".
    Line 19, ", constitutes" should read --constitute--.
    Line 25, "In" should read --in--.
    Line 26, "shown.)" should read --shown)--.

Column 4

Line 8, "If" should read --1f--.
    Line 57, "in" should read --to--.

UNITED STATES PATENT AND TRADEMARK OFFICE
CERTIFICATE OF CORRECTION

PATENT NO. : 5,555,045
DATED : September 10, 1996
INVENTOR(S) : SHINICHI TSUJIMOTO, ET AL.

It is certified that error appears in the above-indentified patent and that said Letters Patent is hereby corrected as shown below:

<u>Column 5</u>

Line 50, delete "causing the camera from".

Signed and Sealed this

Twenty-fifth Day of February, 1997

Attest:

BRUCE LEHMAN

*Attesting Officer*     *Commissioner of Patents and Trademarks*